(12) United States Patent
Ham et al.

(10) Patent No.: US 8,861,333 B2
(45) Date of Patent: Oct. 14, 2014

(54) DUAL PORT ETHERNET COMMUNICATION DEVICE WITH BYPASS FUNCTION

(75) Inventors: Sung sik Ham, Cheongju (KR); Dae Hyun Kwon, Anyang (KR)

(73) Assignee: LS Industrial Systems Co., Ltd., Anyang-Si, Gyeonggi-Do (KR)

( * ) Notice: Subject to any disclaimer, the term of this patent is extended or adjusted under 35 U.S.C. 154(b) by 224 days.

(21) Appl. No.: 13/044,468

(22) Filed: Mar. 9, 2011

(65) Prior Publication Data

US 2011/0222395 A1    Sep. 15, 2011

(30) Foreign Application Priority Data

Mar. 15, 2010    (KR) .................. 10-2010-0022816

(51) Int. Cl.
| | | |
|---|---|---|
| *H04L 1/00* | (2006.01) | |
| *H04L 12/437* | (2006.01) | |
| *H04L 12/40* | (2006.01) | |

(52) U.S. Cl.
CPC ........ *H04L 12/437* (2013.01); *H04L 12/40013* (2013.01)
USPC ............ 370/217; 370/218; 370/221; 370/222

(58) Field of Classification Search
USPC .......... 370/389, 252, 221, 431, 356; 709/229, 709/223; 710/100
See application file for complete search history.

(56) References Cited

U.S. PATENT DOCUMENTS

| | | | |
|---|---|---|---|
| 8,102,844 B1* | 1/2012 | Nelson et al. ................. | 370/389 |
| 2009/0003374 A1* | 1/2009 | Morrissey et al. ............ | 370/463 |
| 2009/0092147 A1* | 4/2009 | Arita et al. .................... | 370/431 |
| 2009/0157888 A1* | 6/2009 | Demmer et al. .............. | 709/229 |

FOREIGN PATENT DOCUMENTS

| | | |
|---|---|---|
| JP | 06-276205 | 9/1994 |
| JP | 2000-041055 | 2/2000 |
| KR | 20-0214405 | 2/2001 |
| KR | 20-0376964 | 3/2005 |

OTHER PUBLICATIONS

The State Intellectual Property Office of the People's Republic of China Application Serial No. 201110064907.0, Office Action dated Apr. 23, 2013, 9 pages.

* cited by examiner

*Primary Examiner* — Andrew Lai
*Assistant Examiner* — Jamaal Henson
(74) *Attorney, Agent, or Firm* — Lee, Hong, Degerman, Kang & Waimey

(57) ABSTRACT

Provided is a dual port Ethernet communication device which allows data received via any one communication port to be bypassed to other communication port. Since the Ethernet communication device performs such bypass operation itself, the communication data can be kept transferred to other terminal unit even though the terminal unit equipped with the Ethernet communication device does not operate normally due to causes such as a break down. In particular, if it is used in each terminal unit forming a closed loop in a closed loop power system, the communication on the closed loop remains such that the adjacent terminal unit can perform backup interrupt function even though a failure happens in a specific terminal unit forming the closed loop.

7 Claims, 3 Drawing Sheets

DUAL PORT ETHERNET COMMUNICATION DEVICE WITH BYPASS FUNCTION

CROSS-REFERENCE(S) TO RELATED APPLICATIONS

Pursuant to 35 U.S.C. §119(a), this application claims the benefit of earlier filing date and right of priority to Korean Application No. 10-2010-0022816, filed on Mar. 15, 2010, the contents of which are hereby incorporated by reference herein in their entirety.

BACKGROUND OF THE INVENTION

1. Field of the Invention

The present invention relates to a dual port Ethernet communication device with bypass function and, more particularly, to a dual port Ethernet communication device with bypass function which allows the dual port Ethernet communication device to bypass data received via one communication port to other communication port so that a terminal unit equipped with the Ethernet communication device can transfer the communication data to other terminal units even though a terminal port equipped with a relevant Ethernet communication device does not operate normally.

2. Description of Related Art

An Ethernet communication device is provided on various terminal units to allow a relevant terminal unit to perform Ethernet communication with other terminals. The Ethernet communication device is required to have only one communication port, when connected to a single communication network such as a personal computer (PC) using internet service.

Meanwhile, the Ethernet communication device is required to have a dual port, when terminal units are required to be connected in a closed loop manner.

As one specific example related thereto, a constant closed-loop system in a distribution system is proposed.

The constant closed-loop system is such that a closed loop is formed by a communication line together with a distribution line where each point is formed with a terminal unit for managing a circuit breaker at a corresponding position. Each terminal unit is connected to it own forward/backward terminal units via a dual port, so that all terminal units form a closed-loop to communicate with each other.

FIG. 1 shows a structure of the closed loop system formed by the terminal units, in which the terminal unit #1 11 to the terminal unit #4 14 have the dual communication port respectively and each terminal unit is connected to its forward/backward terminal units via the dual communication port.

In other words, the terminal unit #1 11 is connected to the terminal unit #2 12 and the terminal unit #4 14 via the dual communication port; the terminal unit #2 12 is connected to the terminal unit #1 11 and the terminal unit #3 13 via the dual communication port; the terminal unit #3 13 is connected to the terminal unit #2 12 and the terminal unit #4 14 via the dual communication port; and the terminal unit #4 14 is connected to the terminal unit #1 11 and the terminal unit #3 13 via the dual communication port.

Referring to FIG. 2, each terminal unit 12 has a port A 12-4 and a port B 12-5 as the dual port and two communication controllers 12-2 and 12-3 for performing the communication correspondingly to the ports respectively, in which each of the communication controllers 12-2 and 12-3 sends and receives the communication data to and from the data bus 12-1 of the terminal unit.

The communication controller A 12-2 transfers the communication data transferred from the data bus 12-1 via the port A 12-4 and transfers the communication data received from the port A 12-4 to the data bus 12-1.

Further, the communication controller B 12-3 transmits the communication data transferred from the data bus 12-1 via the port B 12-5 and transfers the communication data received from the port B 12-5 to the data bus 12-1.

At this time, if the terminal unit 12 fails to operate normally, it is difficult to implement an interface between each communication controller 12-2 and 12-3 via the data bus 12-1, and therefore the communication in the terminal unit 12 is stopped.

More specifically, the communication data cannot be received from the terminal #1 11 and then transferred to the terminal #3 13.

As such, when each terminal unit is connected with each other via the dual port, the communication may be stopped if any terminal unit fails to operate normally due to causes such as a break down.

SUMMARY OF THE INVENTION

The present invention is contemplated to address such problems and an object of the present invention is to provide a dual port Ethernet communication device with bypass function which allows the communication data to be transferred to other terminal unit by transferring communication data directly using the dual port, even though the terminal unit does not operate normally due to causes such as a break down.

To achieve the object of the present invention, the present invention provides a dual-port Ethernet communication device with bypass function, comprising: a first Ethernet controller and a second Ethernet controller which perform Ethernet communication correspondingly to a first communication port and a second communication port connected to a communication line respectively; a first bypass unit which bypasses the data received by the first Ethernet controller via the first communication port to the second Ethernet controller; a second bypass unit which bypasses the data received by the second Ethernet controller via the second communication port to the first Ethernet controller; a first switching unit which selects any one of data transferred by a terminal unit to the first Ethernet controller and data bypassed by the second bypass unit and transfers it to the first Ethernet controller; and a second switching unit which selects any one of data transferred by the terminal unit to the second Ethernet controller and data bypassed by the first bypass unit and transfers it to the second Ethernet controller.

Preferably, the data bypassed by the first bypass unit and the second bypass unit is transferred to the second switching unit and the first switching unit via a dual FIFO respectively.

Preferably, the first switching unit transfers the data bypassed by the second bypass unit to the first Ethernet controller preferentially if the data is input all from the terminal unit and the second bypass unit.

Further preferably, the second switching unit transfers the data bypassed by the first bypass unit to the second Ethernet controller preferentially if the data is input all from the terminal unit and the first bypass unit.

The dual-port Ethernet communication device with bypass function can further comprise a power source unit for supplying an emergency power if the power source of the terminal unit is interrupted.

According to the present invention, it is possible to transfer data received by any communication port of the Ethernet communication device having dual port directly to other communication port.

Therefore, the communication data can be kept transferred to other terminal unit even though the terminal unit equipped with the Ethernet communication device does not operate normally due to causes such as a break down.

In particular, in a constant closed loop system of power system, the communication on the closed loop system can remain and therefore the adjacent terminal unit can perform an immediate backup interrupt function even though a failure happens in the specific terminal unit forming the closed loop.

DESCRIPTION OF SPECIFIC EMBODIMENTS

The advantages, features and aspects of the invention will become apparent from the following description of the embodiments with reference to the accompanying drawings, which is set forth hereinafter.

Figure 1:
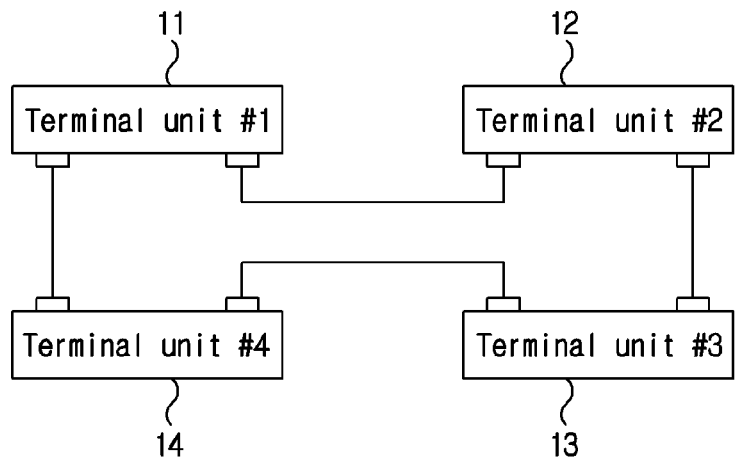
FIG. 1 is a schematic diagram showing a structure of the closed loop system formed by the terminal units using the dual port.
Figure 2:
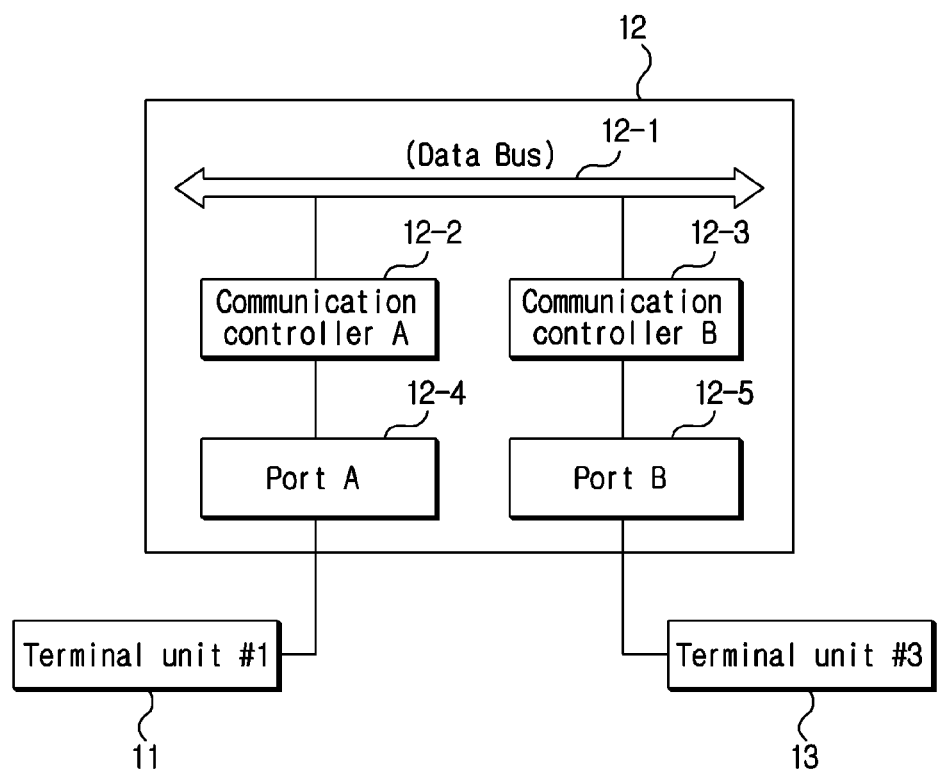
FIG. 2 is a schematic diagram showing a structure of the terminal units connected to the communication line via the dual port according to prior art.
Figure 3:
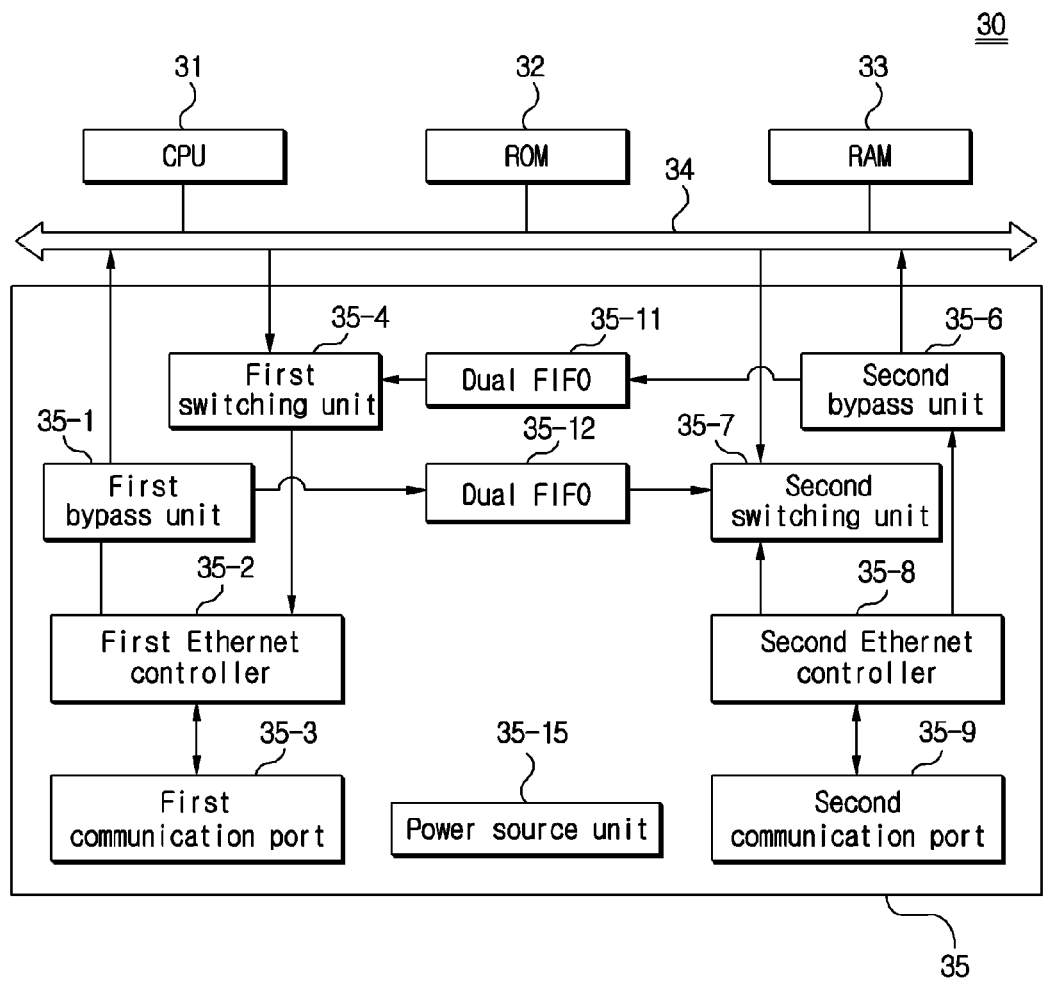
FIG. 3 is a schematic diagram showing one embodiment of the dual port Ethernet communication device with bypass function according to the present invention.

Referring to FIG. 3, the dual port Ethernet communication device 35 with bypass function according to the present invention (hereinafter, called as Ethernet communication device) is provided on the terminal unit 30 to cause the terminal unit 30 to communicate with other terminal unit connected to itself in an Ethernet communication manner.

The terminal unit 30 and the Ethernet communication device 35 can be configured in various shapes to be coupled to each other as necessary.

Generally, the terminal unit 30 includes a central processing unit (CPU) 31 for controlling overall operation of the terminal unit, a Read Only Memory (ROM) 32 for storing a computer program for a basic operation, and a Random Access Memory (RAM) 33 for storing the data temporarily during operation.

Even though not shown distinctly, the terminal unit 30 may include various components such as a non-volatile storage medium capable of reading and writing the data in accordance with function requirements, an input/output unit capable of sending/receiving the data by interfacing with the external device, and a display apparatus for displaying the virtual information on a screen.

If the terminal unit 30 starts to be driven, the Central Processing Unit 31 initiates the operation in accordance with a computer program stored in the ROM 32 and each component such as the Central Processing Unit 31, the ROM 32, the RAM 33, and the Ethernet communication device 35 sends and receives the data with one another via the data bus 34.

The Ethernet communication device 35 has a first communication port 35-3 and a second communication port 35-9 to cause it to be connected to other terminal unit through a physical communication line.

The first Ethernet controller 35-2 and the second Ethernet controller 35-8 are responsible for controlling overall Ethernet communication, and allow the communication to be performed in accordance with Ethernet communication manner correspondingly to the first communication port 35-3 and the second communication port 35-9 respectively.

The first bypass unit 35-1 is responsible for bypassing the data received by the first Ethernet controller 35-2 via the first communication port 35-3 to the second Ethernet controller 35-8; and the second bypass unit 35-6 is responsible for bypassing the data received by the second Ethernet controller 35-8 via the second communication port 35-9 to the first Ethernet controller 35-2.

The reason the first bypass unit 35-1 and the second bypass unit 35-6 bypass the data received via the communication ports 35-3 and 35-9 respectively is for the purpose of allowing the communication data to be transmitted to other terminal unit even though a failure happens in the terminal unit 30.

At this time, it can be configured such that the data bypassed by the first bypass unit 35-1 is transferred to the second switching unit 35-7 via a dual first-in first-out (dual FIFO) 35-12 and the data bypassed from the second bypass unit 35-6 is transferred to the first switching unit 35-4 via other dual first-in first-out (dual FIFO) 35-11.

The first switching unit 35-4 receives the data transferred to the first Ethernet controller 35-2 from the data bus 34 of the terminal unit 30 and the data bypassed by the second bypass unit 35-6. Then it selects any one of them and transfers it to the first Ethernet controller 35-2.

The second switching unit 35-7 receives the data transferred from the data bus 34 of the terminal unit 30 to the second Ethernet controller 35-8 and the data bypassed by the first bypass unit 35-1. Then, it selects any one of them and transfers it to the second Ethernet controller 35-8.

Therefore, the data transferred by the first Ethernet controller 35-2 via the first communication port 35-3 is any one of the data sent by the terminal unit 30 and the data received via the second communication port 35-9.

Further, the data transferred by the second Ethernet controller 35-8 via the second communication port 35-9 is any one of the data sent by the terminal unit 30 and the data received via the first communication port 35-3.

The data transferred by the first switching unit 35-4 and the second switching unit 35-7 to each Ethernet controller can be selected in various manners as necessary.

First, if any one of the data input from the data bus of the terminal unit or the data bypassed from the other Ethernet controller exists, the corresponding data may be transferred to the Ethernet controller.

However, when the data input from the data bus of the terminal unit and the data bypassed from the other Ethernet controller all exist, any one of them must be selected to transfer it to the Ethernet controller.

In such a case, the first switching unit 35-4 and the second switching unit 35-7 can select the bypassed data preferentially.

In other words, the first switching unit 35-4 transfers the data bypassed by the second bypass unit 35-6 to the first Ethernet controller 35-2 preferentially, if the data is input all from the data bus 34 of the terminal unit and the second bypass unit 35-6.

Further, the second switching unit 35-7 transfers the data bypassed by the first bypass unit 35-1 to the second Ethernet controller 35-8 preferentially, if the data is input all from the data bus 34 of the terminal unit and the first bypass unit 35-1.

If the bypassed data is selected preferentially, the data flowing in the communication line can be transferred to other communication device immediately.

Further, since the efficient data is not input from the data bus 34 when the terminal unit 30 does not operate normally, it is preferable that the bypassed data may be transferred preferentially.

Meanwhile, if the power source of the terminal unit 30 kept connected even though the Ethernet communication device 35 operates abnormally, the Ethernet communication device 35 can perform the above-mentioned bypass operation and the transmission operation of the bypassed data to the communication line via the communication port even though it cannot receive the efficient data via the data bus 34.

However, if the power source itself of the terminal unit 30 is OFF, the Ethernet communication device 35 cannot be operated.

The Ethernet communication device 35 can be configured to have a power source unit 35-15 capable of supplying an emergency power to the Ethernet communication device 35, to compete with the situation in which the power source of the terminal unit 30 becomes OFF.

The power source unit 35-15 can be configured using the battery which can supply the electromotive force enough to drive the Ethernet communication device 35 temporally.

Hereinafter, the constant closed loop system in a power distribution system will be described as a specific example.

Figure 4:
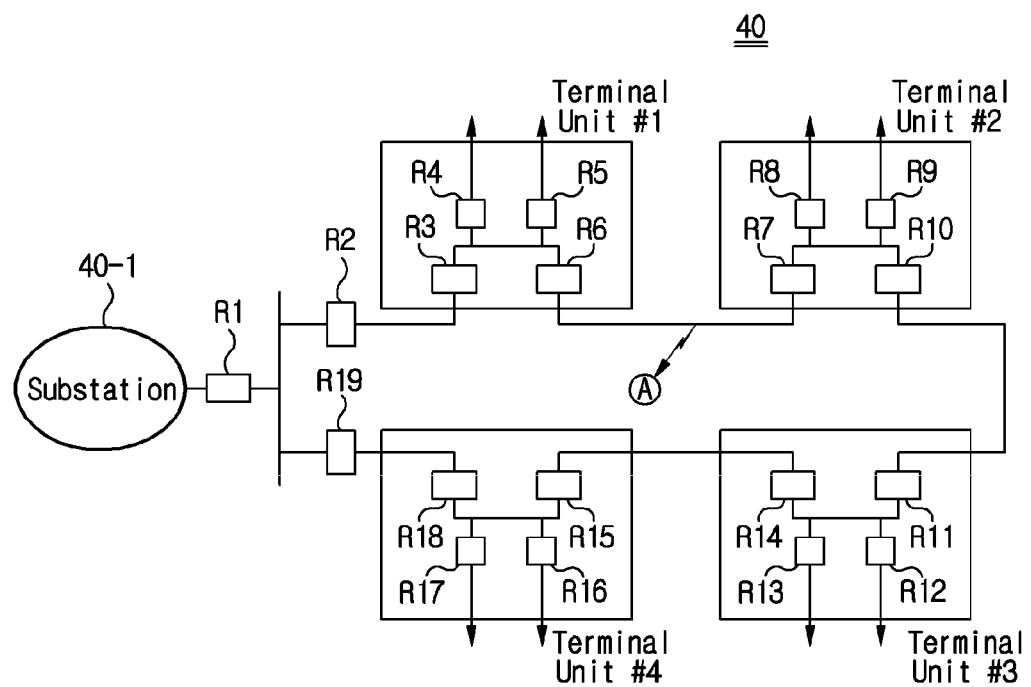
FIG. 4 is a schematic diagram showing the constant closed loop system of a power distribution system.

FIG. 4 is a schematic diagram showing an example of the constant closed loop in the distribution system starting from the substation 40-1. Each of the terminal units 41 to 44 forms the closed loop through the line 40-3 and manages four circuit breakers respectively.

Herein, the line 40-3 includes all the distribution lines and the communication lines, and the communication lines are connected to each other via the dual port to form a close loop. In addition, an optical communication can be used for the purpose of rapid communication.

Multiple circuit breakers R1 to R19 are provided on the substation 40-1 and the closed loop system, in order to break the distribution line connection at a proper point when a failure happens in the power distribution system.

Considering the terminal unit #2 42 as an example, the circuit breakers R7 and R10 are located on the distribution line forming the closed loop to break each point and the circuit breakers R8 and R9 are located in a load side to break the power supplied to the load.

If a failure happens in a point A on the distribution line, the circuit breakers R7 and R6 senses the failure and breaks the distribution line for the purpose of preventing further expansion of the failure, which causes an error such as that only breaker R6 operates but the breaker R7 does not operate.

At this time, it is necessary that each terminal unit 41 to 44 sends and receives the information related to the failure of the point A, such as whether all the circuit breakers R6 and R7 operate normally. In the prior art, if the terminal unit #2 42 does not operate normally, the communication cannot be performed smoothly.

Specifically, if only breaker R6 operates but the breaker R7 does not operate, the terminal unit #3 43 has a difficulty in recognizing that fact and therefore cannot take immediate actions to prevent further expansion of the failure, such as an action of driving the breaker R11 immediately.

Meanwhile, if each terminal unit 41 to 44 is equipped with the Ethernet communication device according to the present invention, the terminal unit #3 43 can recognize from the data from the terminal unit #1 42 that the breaker R6 has been driven and cannot receive from the terminal unit #2 42 a response related to whether the breaker R7 has been driven or not, so that it is possible to confirm the abnormal condition immediately and then take further action such as an action of driving the breaker R11.

While the present invention has been described with respect to the specific embodiments, it will be apparent to those skilled in the art that various changes and modifications may be made without departing from the spirit and scope of the invention as defined in the following claims.

What is claimed is:

1. A dual-port Ethernet communication device with bypass function, the device comprising:
   a first Ethernet controller and a second Ethernet controller configured to perform Ethernet communication correspondingly to a first communication port and a second communication port connected to a communication line respectively;
   a first bypass unit configured to bypass data received by the first Ethernet controller via the first communication port to the second Ethernet controller;
   a second bypass unit configured to bypass data received by the second Ethernet controller via the second communication port to the first Ethernet controller;
   a first switching unit configured to select any one of data transferred by a terminal unit to the first Ethernet controller and data bypassed by the second bypass unit and transfer it to the first Ethernet controller, wherein when the data transferred by the terminal unit and the data bypassed by the second bypass unit are inputted at the same time, the first switching unit selects the data bypassed by the second bypass unit preferentially;
   a second switching unit configured to select any one of data transferred by the terminal unit to the second Ethernet controller and data bypassed by the first bypass unit and transfers it to the second Ethernet controller, wherein when the data transferred by the terminal unit and the data bypassed by the first bypass unit are inputted at the same time, the second switching unit selects the data bypassed by the first bypass unit preferentially, and
   a power source unit configured to supply emergency power when a power source of the terminal unit is interrupted.

2. The device of claim 1, wherein the data bypassed by the first bypass unit is transferred to the second switching unit via a first dual FIFO and the data bypassed by the second bypass unit is transferred to the first switching unit via a second dual FIFO.

3. The device of claim 1, wherein the data transmitted by the first Ethernet controller via the first communication port is any one of data sent by the terminal unit and data received via the second communication port.

4. The device of claim 1, wherein the data transmitted by the second Ethernet controller via the second communication port is any one of data sent by the terminal unit and data received via the first communication port.

5. The device of claim 1, wherein when any one of the data from the terminal unit and the data bypassed by the second bypass unit exists, the first switching unit transfers inputted data to the first Ethernet controller.

6. The device of claim 1, wherein when any one of the data from the terminal unit and the data bypassed by the first bypass unit exists, the second switching unit transfers inputted data to the second Ethernet controller.

7. The device of claim 1, further comprising:
   a Central Processing Unit configured to control overall operations of the Ethernet communication device;
   a first memory configured to store a computer program for operation of the Ethernet communication device; and a second memory configured to store data temporally during operation of the Ethernet communication device.

* * * * *